J. J. TRACY.
TRACTOR PLOW.
APPLICATION FILED OCT. 17, 1912.

1,171,479.

Patented Feb. 15, 1916.
3 SHEETS—SHEET 3.

WITNESSES=
Oliver M. Kappler
Horace B. Fay

INVENTOR
James J. Tracy
BY Fay and Oberlin
ATTORNEYS

UNITED STATES PATENT OFFICE.

JAMES J. TRACY. OF CLEVELAND, OHIO.

TRACTOR-PLOW.

1,171,479. Specification of Letters Patent. Patented Feb. 15, 1916.

Application filed October 17, 1912. Serial No. 726,201.

*To all whom it may concern:*

Be it known that I, JAMES J. TRACY, a citizen of the United States, and a resident of Cleveland, county of Cuyahoga, and State of Ohio, have invented a new and useful Improvement in Tractor-Plows, of which the following is a specification, the principle of the invention being herein explained and the best mode in which I have contemplated applying that principle, so as to distinguish it from other inventions.

My invention relates to an improved means for connecting plows to a tractor and for raising the plows out of the ground.
The quite common use of tractors for plowing has resulted in several devices for the purpose of readily attaching plows to the tractors, and these devices have generally been designed to assist in the raising of the plows when it is necessary to remove the same from the ground for the purpose of turning the tractor out of a furrow, but no wholly satisfactory means have yet been designed for this purpose. A serious objection is to be found with all such devices which have come into general use. While it is a relatively simple matter to connect the plow to the trailer or platform used in standard gang plow construction, and to provide means operable by a man other than the driver for raising the plow from and lowering it to the ground, it is more difficult to directly connect the plow to a tractor and to arrange for the entire operation of such plow by the driver of the tractor without inconvenience or leaving his seat. It is also difficult to prevent oscillation or turning of the plow in a horizontal plane, and still keep a constant depth of furrow. It is for the purpose of eliminating these difficulties and at the same time providing a simple and efficient means for raising, lowering and gaging the depth of operation of the plows that the present invention has been designed.

To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of the various mechanical forms in which the principle of the invention may be used.

Figure 1:
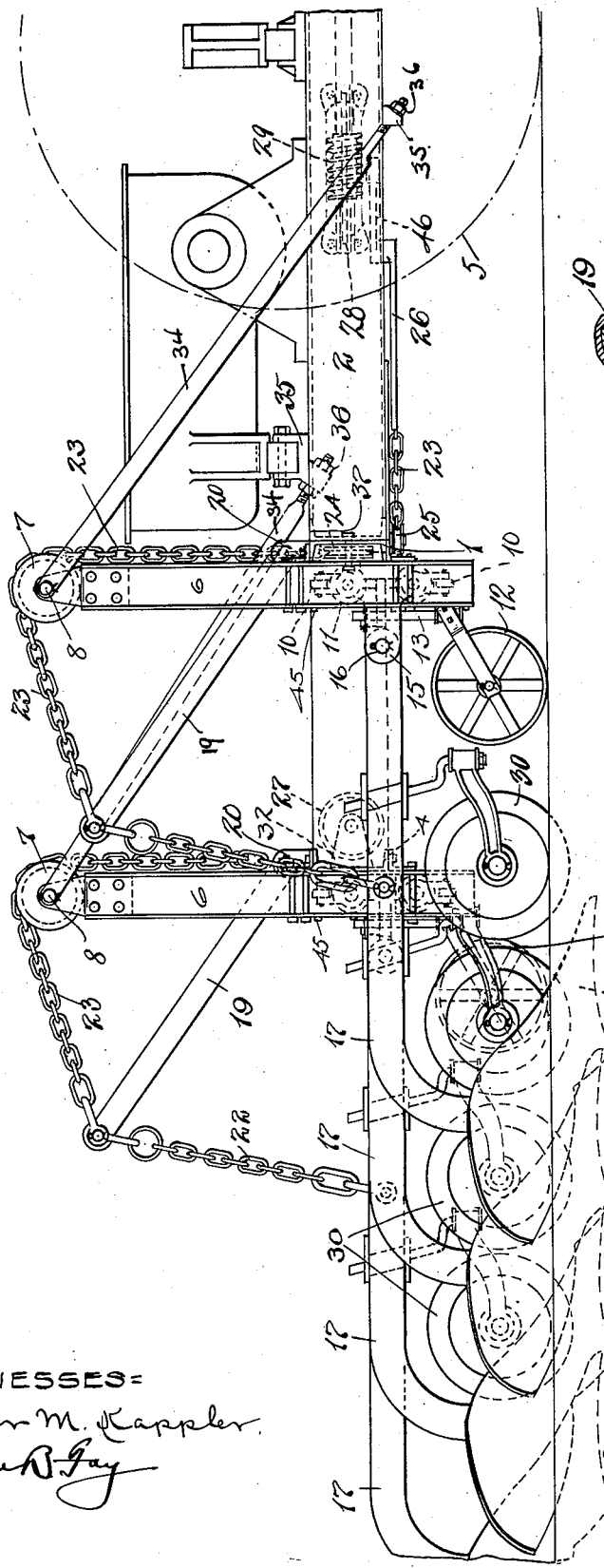
Figure 2:
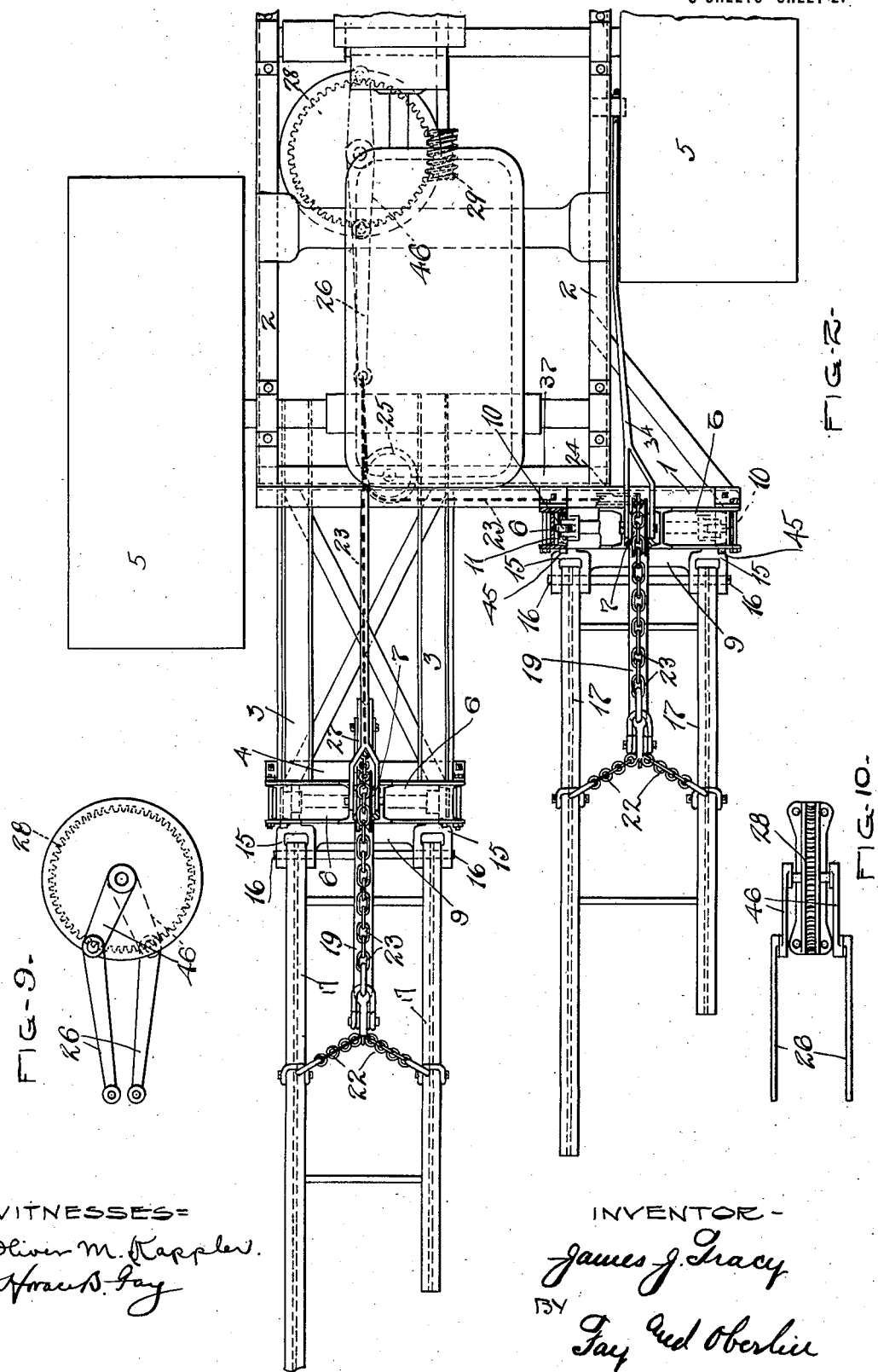
Figure 3:
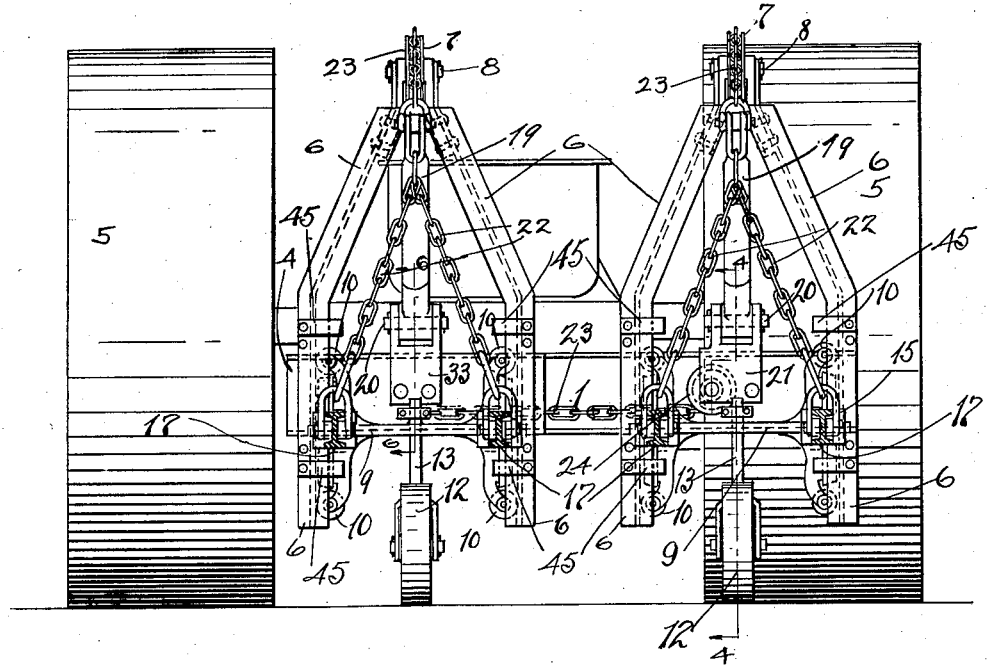
Figure 6:
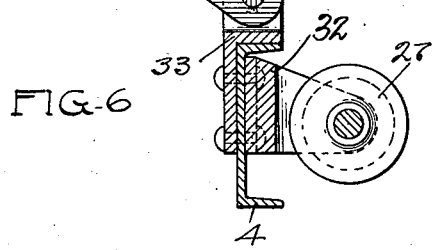
Figure 5:
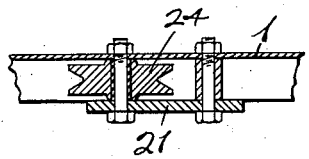
Figure 4:
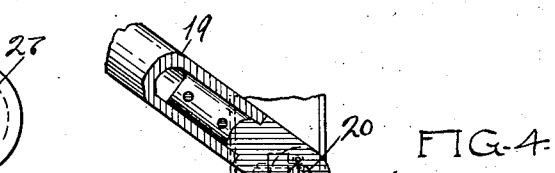

In said annexed drawings:—Figure 1 is a side elevation showing the plows connected by my improved means to a tractor which is shown in part only; Fig. 2 is a plan view of the same; Fig. 3 is a rear view of the tractor only; Fig. 4 is a section on the line 4—4, in Fig. 3; Fig. 5 is a section on the line 5—5, Fig. 4; Fig. 6 is a section on the line 6—6, in Fig. 3; Fig. 7 is a front elevation of the base of one of the booms to be be hereinafter fully described; Fig. 8 is a plan view of a detail of construction; while Figs. 9 and 10 illustrate a modification in construction.

In Fig. 1, the general features of construction of the tractor and of the plows may be seen. The exact construction of the tractor is, of course, of no importance, as any desired type, whether gasolene or steam driven, may be used. The only part of the tractor which is of interest in the present connection is that part of the frame bearing the means for connecting with the plows and the means for actuating the chains or cables which raise the plows out of the ground. The rear portion of the tractor frame is preferably rectangular in plan. At the right side of such frame, or at the lower side, looking at the plan view shown in Fig. 2, there is shown a main cross member 37 extending the full width of the frame and serving to connect the side members 2. On either side of the tractor there are mounted large traction wheels 5 which may be driven by suitable gearing from any desired type of engine (not shown) which will preferably be mounted upon the forward part of the frame.

The plows, which are paired, there being two pairs or gangs illustrated in the present construction, are attached to the main frame of the tractor through the medium of a transverse channel 1, removably secured directly to the outer face of cross member 37, as shown in Fig. 1. At the upper side of the view shown in Fig. 2, or the left side of the tractor, there is provided an extension frame consisting of two parallel members 3 connected at their outer ends by a connecting member 4. The connecting member 4 serves the same purpose as the connecting member 1, so far as regards the means for attaching the transverse channel 37 to the plows.

Upon each of the cross members 1 and 4 of the detachable frame to which the plows are connected, there are mounted two vertically disposed members 6, consisting of I-beams with their lower portions in parallel relation so as to form guide-ways, while their upper portions are inclined toward each other to form a derrick like structure, at the top of which there is mounted a pulley 7 around a transversely disposed horizontal shaft 8.

The connecting means for attaching each set or pair of the plows to the detachable frame, comprise a block or frame 9 which consists of a straight horizontal bar connecting two vertical arms, each of which is provided with rollers 10 contacting the inner surface of the U-shaped guide-ways formed by the straight portions of the I-beams 6, and other rollers 11 which fit snugly between the side flanges of the U-shaped guide-ways and still revolve upon movement of the trucks. Such rollers 11, are slightly less in diameter than the distance between the sides of the guide-ways and will freely roll along the particular flange of the guide-way with which they happen to contact, while at the same time they serve to prevent any lateral movement of the trucks.

Each frame 9, is provided with a wheel 12, to the axle of which there is attached an upwardly extending member 38 having a sleeve 39, such sleeve encircling a stem or rod 13 provided with shoulders 14. The rod 13 extends upwardly through an aperture in the bar of the frame. The engagement between the member 13 and the aperture in the bar is a sliding one, the position of the wheel being determined by means of a U-shaped clamp 40 provided with threaded ends and adapted to clamp the stem 13 to an upstanding lug 42 on the bar 9 adjacent to the aperture therein, when nuts 41 on such clamp ends are drawn tight. By adjusting the position of the wheel 12 in this fashion, any desired depth of furrow may be turned over. Undue movement of the frame 9, it should be added, whether in an upward or a downward direction, is prevented by means of lugs 45 on the guide members 6, which act as stops by engaging with the respective ends of the frame (see Figs. 3 and 4).

The cross bar of each frame 9 is provided with rearwardly extending pairs of apertured ears 15, such ears being parallel and being provided with pins 16, to which there will be attached the forward ends of the beams 17 of the plows. The axis about which the plows will rotate is therefore a transverse horizontal one. To each beam 17, there will be attached a plow body 18 shown in Fig. 1, and a colter 30, the attachment of the colter to the beam 17 being such that the colter is free to swing about a substantially vertical axis. The attachment will be readily apparent from Fig. 1.

The means for connecting the plows to the tractor having now been described, the means for raising the plows will be taken up. Such means include boom members 19, there being preferably provided one boom for each pair of plows, or one for each of the derricks 6, such booms being pivotally mounted about transversely disposed horizontal pins 20 attached to plates 21 and 33 which are bolted to the connecting members 1 and 4 respectively. A front elevation of the former of these plates is shown in Fig. 7. One boom member is provided for each gang of plows, such boom extending in its normal position to a point substantially above the center of gravity of the composite "plow" structure consisting, in the construction illustrated, of two beams 17 with attached plow bodies and colters, as well as the connecting frame 9 with its gage-wheel 12. The beams 17 of each pair or gang of individual plows are transversely braced as appears in Fig. 2, and such braces are also to be considered a part of the plow structure just referred to.

Attached to the end of each boom member 19, are cables preferably consisting of chains 22, which are respectively attached to the beams 17 of the corresponding plow at a point slightly in front of the center of gravity of such plow, using the latter term in the composite sense defined above. Other chain-cables 23 are attached to the ends of said boom members, respectively, for raising and lowering the same and thereby raising and lowering the corresponding plows, the chain 23 at the right side of the tractor passing over the corresponding pulley 7 and down to the supporting frame over a pulley 24 that is disposed parallel with the transverse channel member 1 of said frame. This chain then passes along such channel to a pulley 25, lying in a horizontal plane, and thence to a link 26 that is pivotally attached to a crank 46, operated by a worm gear 28. The chain 23 for the composite plow at the left side of the tractor, after passing over the corresponding pulley 7, is thence carried under a longitudinally disposed pulley 27 attached to channel 4 of the supporting frame in line with pulley 25 about which the first named chain 23 passes. Such second chain 23 is attached to the same link 26 as said first chain, so that upon rotation of the gear wheel 23, both said chains will be drawn in or paid out, as the case may be, a distance equal to the throw of the crank 46. The amount of throw of said crank is designed to be such that, upon a half revolution of the gear, the link will be moved a sufficient distance to raise the plows completely out of the ground, the chains 23 being normally allowed sufficient slack when the plows are in the ground, so that the movement of the latter in a vertical direction, is not hampered by said chains.

The chain 22 is attached to each plow beam 17 at a point slightly forward of the center of gravity, thus assisting in the raising of the plows from the furrow, as a very slight pull on the chain will cause the plows to tilt upwardly at their forward ends and the shape of the plow bodies will then at once force the plows out of the ground as the tractor continues movement. The greater weight of the rear portion of the plow will of course cause that portion to be lowered first.

Instead of having both gangs or sets of individual plows thus raised and lowered simultaneously, separate crank arms actuated by such gear 28 may be provided for each of the chains 23, and the angular disposition of said crank arms be made such that the right hand set of plows will be lifted in advance of the set at the left, thus rendering it possible to bring the furrow formed by the latter plows to a line with those made by the first set of plows. The modified construction of the actuating worm gear 28 with two cranks 46, is shown in Figs. 9 and 10, the first of which is a plan view of this detail of the mechanism corresponding to the plan view in Fig. 2, while the latter is a side elevational view thereof corresponding to that appearing in Fig. 1. A separate link 26 is provided in connection with each of these arms whereby the respective chains 23 may be attached to the latter.

The worm gear 28 in either form of construction is designed to be operated from the same motor which is utilized to drive the tractor, it being understood that a suitable clutch connection will be provided between said motor and the worm whereby the driver of the tractor may conveniently shift such worm into and out of operative connection with such motor. Moreover, the driving connection between the worm and the worm gear is such as to render the latter irreversible; in other words, it will remain locked by the worm in whatever position it is left upon stopping the rotation of the latter, and thus is adapted to hold the plows in their raised position without special means being required for this purpose.

It will be understood that while but two sets of gangs of plows are shown in the illustrated construction, (each such set comprising two individual plow-bodies carried by the supporting structure made up of the plow-beams 17 and cross-braces), the number of such sets as well as the number of individual plow-bodies comprised in each, may be varied, while still utilizing the foregoing operating mechanism for raising and lowering the plows, as also the previously described connections between the plows and the tractor. Thus were it desired to use six instead of four plow-bodies, these might be arranged in three sets, or gangs, each comprising two plow bodies, or two sets of three plow-bodies might be substituted for the two sets of two bodies each which I have illustrated.

Details of the manner in which the pulley 24, about which the one chain 23 passes, is mounted, are shown in Fig. 5, from a reference to which it will be observed that said pulley is rotatably held between the flanges 31 of the channel constituting the cross member 1 of the general frame, by means of a plate 21 secured to said channel by two bolts, one of which forms the axis for the pulley. The plate 21 is further utilized to form the pivotal support for the corresponding boom 19, as has already been explained. The pulley 27, about which the other chain 23 passes, is held in a special bracket 32 (see Fig. 6) bolted to the inner face of the cross member 4 of the main frame of the plow, being secured thereto by the same bolts which attach the plate 33 that serves as a base for the boom 19 on this side of the plow.

Suitable stays or braces are provided for the derricks formed by the guide-ways 6, these braces consisting of rods 34 forked at their upper ends so as to be adapted to be attached on each side of the pulleys 7, respectively. The lower end of the one rod, that on the right hand side of the machine, as shown in Figs. 1 and 2, is attached to the side member of the tractor frame by a lug 35 and nut 36, while the other brace has its lower end attached by a similar lug and nut, to the axle of the adjacent wheel 5. The foregoing mode of attachment of these braces permits them to be detached from the tractor frame along with member 1 of the main plow frame, when it is desired to detach the plows from the tractor and leave the latter free for other uses.

Among the several advantages of my new and improved construction of tractor plow may be enumerated the simple, but efficient, means for raising and lowering the plows directly by the driver of the tractor, thus rendering it unnecessary to employ more than the one operator for the whole machine; the several gangs of plows are effectively held against side swaying and rolling and yet are allowed to turn their respective furrows without being affected by the rising and falling movements of the tractor frame as the tractor passes over inequalities in the ground. The plows, in other words, are allowed to accommodate themselves with perfect freedom to such inequalities, this being essential if furrows of uniform depth are to be made. This mode of hitching the plow-supports to the tractor frame gives also the advantages secured in the standard construction of trailer gang-plows while, by reason of the close coupling of the plows to the tractor, and their being directly supported therefrom, the tractor can be turned and backed with perfect freedom.

The various detailed features of construction, such as the mounting of the booms on the main plow frame and the disposition of the various pulleys and other parts are also designed with a view to rendering the structure as a whole, both simple and durable by providing a maximum of strength and safety in these parts.

Other modes of applying my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a tractor; of a plow support; a guideway consisting of two spaced U-shaped members opening toward each other, said guideway being vertically mounted on said tractor; and a frame provided with rollers adapted to contact the front and sides of said two U-shaped members, thereby securing said frame against rocking in any direction, said frame being connected to said plow support.

2. The combination with a tractor; of a plow-support; a guideway consisting of two spaced U-shaped members opening toward each other, said guideway being vertically mounted on said tractor; a frame provided with rollers adapted to contact the front and sides of said two U-shaped members, thereby securing said frame from lateral movement, said frame being connected to said plow-support about a horizontal pivotal axis; and means adapted to raise and lower said plow-support.

3. The combination with a tractor; of a plow support; two spaced U-shaped guides opening toward each other, said guides being vertically mounted on said tractor; a frame slidably mounted between said members and attached to said support; and means adapted to move said support vertically, said means being connected to said support near its center of gravity, and said plow support extending rearward from said frame.

4. The combination with a tractor; of a plow support; a guideway consisting of two spaced U-shaped members opening toward each other, said guideway being vertically mounted on said tractor; a frame slidably mounted between said members and attached to said support; and means adapted to move said support vertically, said means being connected to said support slightly forward of its center of gravity.

5. The combination with a tractor; of a plow support; means connecting said tractor and said plow support, said means being vertically slidably mounted on said tractor; a boom pivotally mounted on said tractor and extending over said support; a cable attached to the outer end of said boom and to said support slightly forward of the center of gravity of the latter; and means adapted to actuate said boom, thereby raising and lowering said support through said cable.

6. The combination with a tractor; of a plow support; means connecting said tractor and said plow support, said means being vertically slidably mounted on said tractor; a boom pivotally mounted on said tractor and extending over said support; a cable attached to the outer end of said boom and to said support slightly forward of the center of gravity of the latter; and rotatable means mounted on said tractor and adapted to actuate said boom, thereby raising and lowering said support through said cable.

7. The combination with a tractor; of a plurality of plow-supports; an equal number of vertically disposed guideways mounted on the rear of said tractor; connecting means for each of said plow-supports and its respective guideway, said means being slidably mounted in such guideway and attached to said support about a horizontal transverse axis; a plurality of booms mounted on said tractor and extending over said supports; cables attached to said supports and to said booms; and means for simultaneously actuating all of said booms to raise and lower said plows through said cables.

8. The combination with a tractor; of a plow-support; a vertically disposed guideway mounted on said tractor; connecting means slidably mounted in said guideway and attached to said plow-support; a boom mounted on said tractor about a transverse horizontal axis and extending over said support; a pulley mounted at the top of said guideway; a second pulley mounted on said tractor; a movably mounted link; a cable attached to said support and to said boom and passing over said pulley, the other end of said cable member being attached to said link; and means adapted to actuate said link to thereby raise and lower said boom and support.

9. The combination with a tractor; of a plurality of plow-supports; an equal number of vertically disposed guideways mounted on the rear of said tractor; connecting means for each of said plow-supports and its respective guideway, said means being slidably mounted in such guideway and attached to said support about a horizontal transverse axis; a plurality of booms mounted on said tractor and extending over said support; cables attached to said supports and to said booms; and means for simultaneously actuating all of said cables to thereby raise and lower said plows.

10. The combination with a tractor; of two plow-supports; two vertically disposed guideways mounted on the rear of said tractor; pulleys mounted at the top of said guideways about transverse horizontal axes; connecting means for each of said plow-supports and its respective guideway, said means being slidably mounted in such guideway and being pivotally attached to said supports about a transverse horizontal axis; two booms pivotally mounted on said tractor about transverse horizontal axes, one of said booms extending over each of said supports; a cable attached to each support and to the overhanging boom, said cables running over said pulleys on said guideways and being connected; and means attached to said connected cables, said means being adapted, when actuated, to draw in said cables to thereby raise and lower said plows simultaneously.

Signed by me this 14th day of October, 1912.

JAMES J. TRACY.

Attested by—
 HORACE B. FAY,
 MARY GLADWELL.